(12) United States Patent  
Mita

(10) Patent No.: US 10,040,263 B2  
(45) Date of Patent: Aug. 7, 2018

(54) PNEUMATIC TIRE

(71) Applicant: The Yokohama Rubber Co., LTD., Minato-ku, Tokyo (JP)

(72) Inventor: Masaya Mita, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/543,971

(22) PCT Filed: Jan. 8, 2016

(86) PCT No.: PCT/JP2016/050476  
§ 371 (c)(1),  
(2) Date: Jul. 14, 2017

(87) PCT Pub. No.: WO2016/114229  
PCT Pub. Date: Jul. 21, 2016

(65) Prior Publication Data  
US 2018/0009184 A1    Jan. 11, 2018

(30) Foreign Application Priority Data  
Jan. 14, 2015 (JP) .................................. 2015-004722

(51) Int. Cl.  
*B60C 1/00* (2006.01)  
*B60C 5/14* (2006.01)  
(Continued)

(52) U.S. Cl.  
CPC ............ *B29D 30/3007* (2013.01); *B60C 5/14* (2013.01); *B29D 2030/0682* (2013.01); *B60C 1/0008* (2013.01)

(58) Field of Classification Search  
CPC ................ B29D 30/30; B29D 30/3007; B29D 2030/0682; B60C 1/0008; B60C 5/14; B60C 5/142  
See application file for complete search history.

(56) References Cited

U.S. PATENT DOCUMENTS

2009/0320983 A1    12/2009    Sawada et al.  
2013/0174953 A1    7/2013    Koishikawa  
(Continued)

FOREIGN PATENT DOCUMENTS

JP    H08-217932    8/1996  
JP    2006-198848    8/2006  
(Continued)

OTHER PUBLICATIONS

International Search Report for International Application No. PCT/JP2016/050476 dated Apr. 19, 2016, 4 pages, Japan.

*Primary Examiner* — Justin R Fischer  
(74) *Attorney, Agent, or Firm* — Thorpe North & Western

(57) ABSTRACT

Provided is a pneumatic tire having an innerliner member pasted on a tire inner circumferential surface, the innerliner member being constituted from an at least three-layer structure including a film having a main component of a thermoplastic resin or a thermoplastic elastomer composition containing a blend of a thermoplastic resin and an elastomer, and rubber sheets layered on both sides of the film, the tire comprising a lap splice portion in which tire circumferential direction end portions of the film are overlapped via the rubber sheets. In the lap splice portion, the thickness of the film positioned at least on the tire radial direction inner side decreases toward the tip of the end portion thereof, and this tip bends toward the outer side or the inner side in the tire radial direction, and the tip is covered by the rubber sheets.

12 Claims, 4 Drawing Sheets

(51) Int. Cl.
  *B29D 30/30* (2006.01)
  *B29D 30/06* (2006.01)

(56) References Cited

U.S. PATENT DOCUMENTS

2013/0269850 A1  10/2013  Seto et al.
2015/0083298 A1  3/2015   Koishikawa

FOREIGN PATENT DOCUMENTS

| JP | 2008-012945 | | 1/2008 |
|----|----|----|----|
| JP | 2009-241855 | | 10/2009 |
| JP | 2012-6499 | * | 1/2012 |
| JP | 2012-006499 | | 1/2012 |
| JP | 04118302 | * | 1/2012 |
| JP | 5310879 | * | 10/2013 |
| JP | 5423732 | * | 2/2014 |
| WO | WO 2008/053747 | | 5/2008 |
| WO | WO 2012/086276 | | 6/2012 |

* cited by examiner

PNEUMATIC TIRE

TECHNICAL FIELD

The present technology relates to a pneumatic tire formed so as to suppress tire failure arising in the splice portion of the innerliner.

More particularly, it relates to a pneumatic tire having an innerliner member on the tire inner circumferential surface, the innerliner member containing a film having a main component of a thermoplastic resin or a thermoplastic elastomer composition containing a blend of a thermoplastic resin and an elastomer, the pneumatic tire having a structure in which the tire circumferential direction end portions of the innerliner member are mutually overlapped and lap spliced, wherein the pneumatic tire is formed so as to suppress the occurrence of tire failures during vulcanization molding and during travel.

BACKGROUND ART

Various studies have recently been conducted on the use of a film as an innerliner member, the film having a main component of a thermoplastic resin or a thermoplastic elastomer composition containing a blend of a thermoplastic resin and an elastomer, in order to achieve both a reduction in total tire weight and improved high air permeation preventive properties (for example, see Japanese Unexamined Patent Application Publication No. H08-217932A and International Patent Application Publication Nos. WO 2008/53747 and WO 2012/086276).

For example, studies have been conducted on the use of an innerliner member as a tire structural member, the innerliner member being pasted on the tire inner circumferential surface, the innerliner member being constituted from an at least three-layer structure including a film having a main component of a thermoplastic resin or a thermoplastic elastomer composition containing a blend of a thermoplastic resin and an elastomer, and rubber sheets layered on both sides of the film. To use an innerliner member of this type as a tire structural member, a production method is employed wherein the innerliner member is wound around a tire molding drum, the end portions thereof are lap spliced, and the tire is submitted to a vulcanization step (for example, see Japanese Unexamined Patent Application Publication Nos. 2006-198848A and 2012-6499A).

Specifically, there is a technique in which an innerliner member having such a layered structure is wound around a tire molding drum so as to have a cylindrical shape, and at that time the two circumferential direction end portions are lap spliced to each other and then the tire is submitted to a vulcanization molding step to produce a pneumatic tire.

When such a technique is used, it is preferable to use an innerliner member configured from an at least three-layer structure including a film and rubber sheets layered on both sides of the film, because the rubber sheets are overlapped and lap spliced to each other and the two end portions can be securely bonded.

However, during the process from during vulcanization molding to immediately after molding, separation occurs at the interfaces between the film and rubber sheets, and the bond portion (splice portion) opens.

To describe this through drawings, as illustrated in FIG. 4A, an innerliner member 1 constituted of an at least three-layer structure including a film 2, having a main component of a thermoplastic resin or a thermoplastic elastomer composition containing a blend of a thermoplastic resin and an elastomer, and rubber sheets 3A, 3B layered on both sides of the film 2 is formed into a required size (length) determined according to tire size, and a lap splice portion 4 is provided on both end portions thereof on a tire molding drum 5 illustrated schematically by double-dotted lines. The end portions are overlapped and lap sliced to each other so that the innerliner member is formed into a ring as a whole. The rubber sheet 3B functions as tie rubber having a function of bonding with other tire components such as the carcass layer. In FIGS. 4A to 4C, the top is the tire radial direction outer side, the bottom is the tire radial direction inner side, and the lateral direction is the tire circumferential direction.

In the steps from green tire molding to vulcanization molding, the lap splice portion 4 of the innerliner member 1 may incur a separation condition 6 at the interface between the film 2 and rubber sheet 3A as illustrated in FIG. 4B, particularly at the interfaces in the vicinity of the end portions. For example, because the adhesion bonding force (tack) between the surface of the molding drum 5 and the rubber sheet 3A constituting the innerliner member 1 is strong, when the green tire is molded and removed from the molding drum 5, the vicinity of the end portions of the rubber sheet 3A is pulled toward the molding drum 5 side, causing a separation condition 6 at the interface between the film 2 and rubber sheet 3A.

As a whole, the innerliner member after vulcanization molding forms an innerliner layer 10 as illustrated in FIG. 4C. In the vicinity of the lap splice portion 4, the end portions of the film 2 overlap, with members consisting of rubber sheets interposed therebetween. The region surrounded by a dotted line in the tip vicinity 7 of the film 2 of FIG. 4C is a position where attention should be paid to tire failure, such as separation of the film 2 and rubber members during molding of the pneumatic tire and during travel.

SUMMARY

The present technology provides a pneumatic tire formed so as to suppress tire failure arising in the splice portion of the innerliner.

The pneumatic tire of the present technology is a pneumatic tire having an innerliner member 1 pasted on a tire inner circumferential surface, the innerliner member 1 being constituted from an at least three-layer structure including a film 2 having a main component of a thermoplastic resin or a thermoplastic elastomer composition containing a blend of a thermoplastic resin and an elastomer, and rubber sheets 3A, 3B layered on both sides of the film 2, the tire comprising a lap splice portion 4 in which tire circumferential direction end portions of the film 2 are overlapped via the rubber sheets 3A, 3B; in the lap splice portion 4, a thickness of at least the film 2 positioned on a tire radial direction inner side decreases toward a tip 2e of an end portion thereof, and the tip 2e bends toward an outside or an inside in the tire radial direction, and the tip 2e is covered by the rubber sheets 3A, 3B.

Furthermore, the method for producing a pneumatic tire of the present technology is a method for producing a pneumatic tire, the method including a step of splicing an innerliner member 1 by mutually overlapping two end portions thereof in a tire circumferential direction on an outer circumference of a tire molding drum; a composite sheet being used as the innerliner member 1, the composite sheet being constituted from an at least three-layer structure including a film 2 having a main component of a thermoplastic resin or a thermoplastic elastomer composition containing a blend of a thermoplastic resin and an elastomer, and rubber sheets 3A, 3B layered on both sides of the film 2, at least one end portion of the film 2 being a tapered bending structure decreasing in thickness toward a tip 2e of the end portion, the tip 2e bending in an out-of-plane direction of the film 2, and the tip 2e being covered by the rubber sheets 3A, 3B; and the film 2 is lap spliced such that an end portion of the innerliner member 1, which is a tapered bending structure, is mounted on a tire molding drum and started to be wound, and tire circumferential direction end portions of the film 2 mutually overlap via the rubber sheets 3A, 3B.

The pneumatic tire of the present technology provides a pneumatic tire having excellent durability, wherein the occurrence of delamination and opening of the lap splice portion during vulcanization molding is suppressed, and tire failure does not occur, such as cracking occurring in the vicinity of the lap splice portion 4 after the pneumatic tire starts to travel, because the film 2 on the tire radial direction inner side of the lap splice portion 4 is formed such that the thickness thereof decreases toward the tip 2e, and this tip 2e bends toward the outer side or the inner side in the tire radial direction, and the tip 2e is covered by the rubber sheets 3A, 3B.

Furthermore, according to the method for producing a pneumatic tire of the present technology, the excellent pneumatic tire described above can be produced easily and reliably.

In the present technology, when the thickness of the main body of the film 2 is taken as t, the thickness T of the tip 2e is preferably from 0.05t to 0.2t. Furthermore, the length L of the region in which the thickness of the film 2 decreases is preferably from t×2 to t×4. The thickness t of the main body of the film 2 is preferably from 50 μm to 200 μm.

On the equator direction cross section of the pneumatic tire, the bend angle θ, formed by a tangent line at a point F at which the center line in the thickness direction of the film 2 starts to bend and a straight line connecting the bend starting point F and the center of thickness T of the tip 2e, is preferably from 90° to 135°. Furthermore, the length S of the lap splice portion 4 is preferably in a range from 3 to 30 mm.

BRIEF DESCRIPTION OF DRAWINGS

FIG. 4A illustrates a state in which the innerliner member has been formed into a ring by overlapping the two end portions in the circumferential direction and splicing. FIG. 4B schematically illustrates a state in which separation has occurred between the film and a rubber sheet when the tire is molded in the state illustrated in FIG. 4A. FIG. 4C illustrates a structural example of the splice portion after vulcanization.

DETAILED DESCRIPTION

Figure 1:
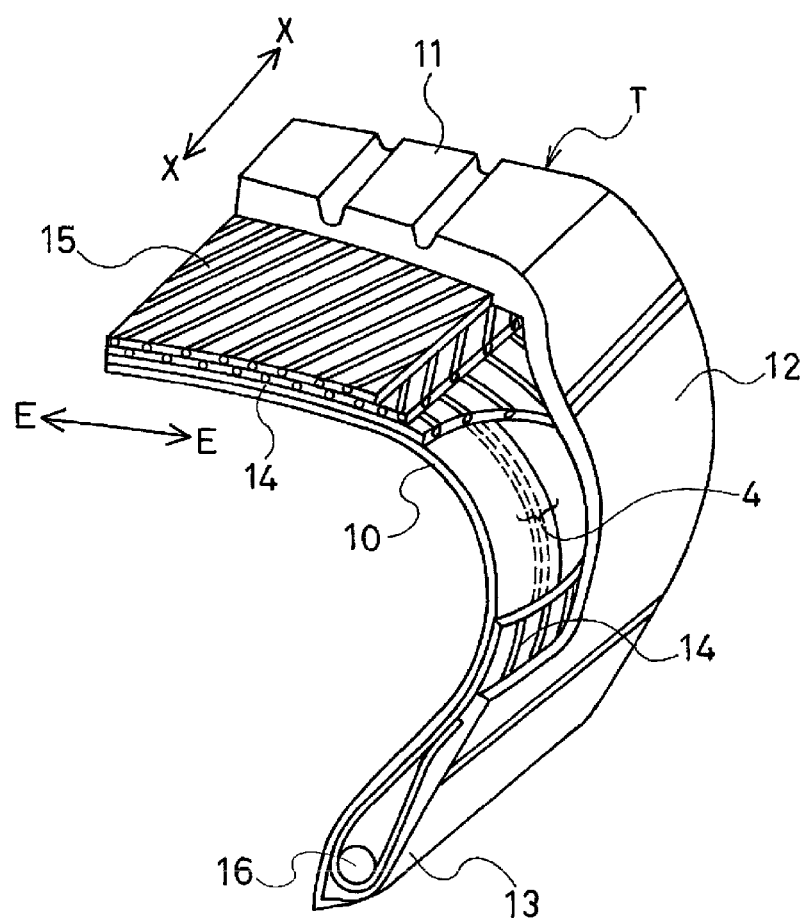
FIG. 1 is a partially fractured perspective view illustrating an example of an embodiment of the pneumatic tire of the present technology. It explains the positional relationship of the lap splice portion of the innerliner member within the tire.

A detailed explanation of the pneumatic tire of the present technology will be given below while referencing the drawings. FIG. 1 is a partially fractured perspective view illustrating an example of an embodiment of the pneumatic tire of the present technology. The arrow E indicates the tire width direction, and the arrow X indicates the tire circumferential direction.

In FIG. 1, a pneumatic tire T is provided such that sidewall portions 12 and bead portions 13 are connected on the left and right of a tread portion 11. On the tire inner side of the pneumatic tire T, a carcass layer 14 that acts as a framework of the tire is provided so as to extend between the left and right bead portions 16, 16 in the tire width direction. Two belt layers 15 composed of steel cords are provided on the outer circumferential side of the carcass layer 14 corresponding to the tread portion 11. An innerliner layer 10 is disposed on an inner side of the carcass layer 14, and a splice portion 4 thereof is present extending in the tire width direction.

Figure 2:
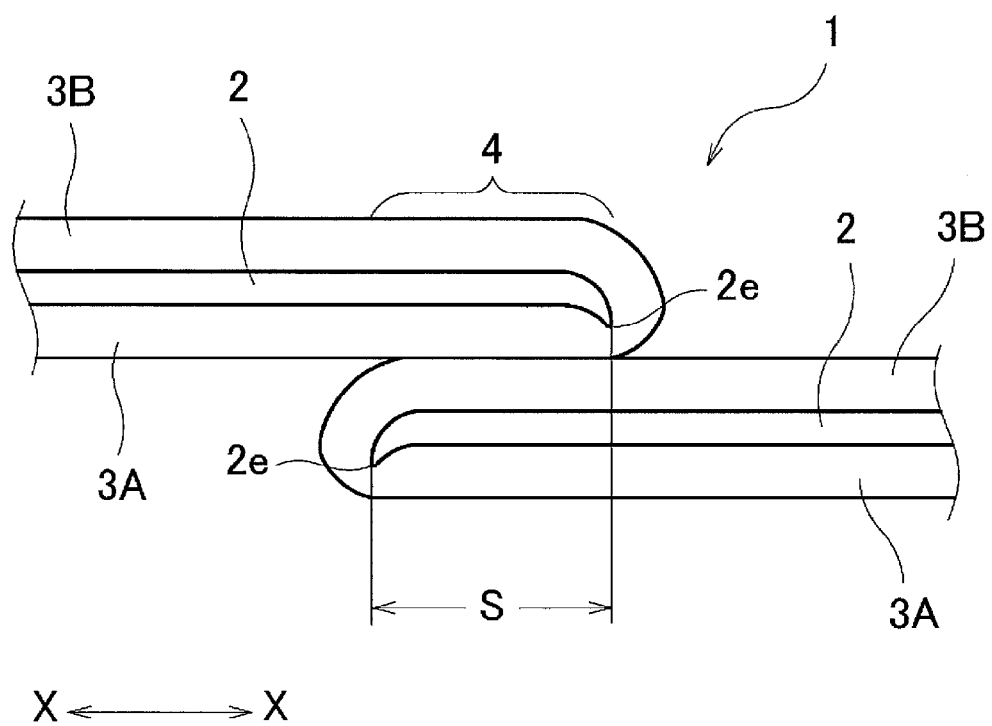
FIG. 2 is an explanatory drawing illustrating an enlargement of a portion of a tire equator direction cross section, exemplifying an embodiment of the lap splice portion of the innerliner member of the pneumatic tire of the present technology.

The pneumatic tire of the present technology in FIG. 2 has an innerliner member 1 on the inner circumferential surface thereof, and has a lap splice structure in which the end portions of both sides thereof in the tire circumferential direction are mutually overlapped and spliced. The innerliner member 1 is constituted by an at least three-layer structure including a film 2 and rubber sheets 3A, 3B layered on the two sides thereof. The film 2 has a main component of a thermoplastic resin or a thermoplastic elastomer composition containing a blend of a thermoplastic resin and an elastomer. Note that in FIG. 2 and in FIGS. 3A and 3B described below, the cross section of the main body of the film 2 and rubber sheets 3A, 3B are drawn in a linear shape for ease of understanding. The film 2 and the rubber sheets 3A, 3B extend with adequate curvature according to the size of the pneumatic tire.

The film 2 that constitutes the innerliner member 1 has a tapered bending structure in which the thickness of the film 2 positioned at least on the tire radial direction inner side decreases toward the tip 2e of the end portion thereof, and this tip 2e bends toward the outer side or the inner side in the tire radial direction. The end portion of the film 2 disposed on the tire radial direction inner side of the splice portion 4 is required to have the tapered bending structure described above. The end portion of the film 2 disposed on the radial direction outer side may have any tapered bending structure. At the same time, the tip 2e of the film 2 is covered by the rubber sheets 3A, 3B. The bond of the two ends of the innerliner member 1 (film 2) with each other has high adhesive strength because it is a structure in which the film 2 overlaps itself via the rubber sheets 3A and 3B, and rubber is bonded to rubber and vulcanized.

Due to the fact that the end portions of the film 2 have a tapered bending structure and are covered by the rubber sheets 3A, 3B, separation of the film 2 and the rubber sheet 3A can be suppressed. That is, when removing the molded green tire from the molding drum 5, even if the vicinity of the end portion of the rubber sheet 3A is pulled toward the molding drum 5 side, that force is divided into a force that acts along the surface of the end portion of the tapered bending structure of the film 2 and a force that acts in the direction perpendicular to the surface of the film 2. Therefore, it acts in the direction perpendicular to the tapered bent end portion of the film 2, and the force that causes separation of the rubber sheet 3A is reduced. Additionally, the shear force that acts along the surface of the tapered bent end portion is absorbed and reduced due to the tapered bent end portion flexibly deforming naturally. As a result, during molding of the pneumatic tire, separation of the rubber sheet 3A from the film 2 can be suppressed, and quality and productivity of the pneumatic tire can be improved.

Furthermore, as described above, when producing the pneumatic tire, lap splicing of the innerliner member 1 can be performed reliably and failure can be suppressed, and the condition of the tapered bent end portions of the film 2 is maintained in the molded tire. For this reason, when the pneumatic tire is mounted on a vehicle and use begins, tire failure such as the occurrence of cracking or separation in the vicinity of the splice portion on the tire inner circumferential surface and opening of the bond portion during travel is suppressed, and tire durability can be greatly improved.

The direction in which the tips 2e of the film 2 of the present technology bend may also deviate in the outward and inward directions of the tire radial direction. Furthermore, the tip 2e of the film 2 on at least the radial direction inner side of the lap splice portion may have a tapered bending structure, and the tip 2e of the film 2 on the radial direction outer side of the lap splice portion may have any tapered bending structure. Additionally, when the tips 2e on the radial direction inner side and outer side have a tapered bending structure, the two may bend in the same direction or in opposite directions. Preferably, the tips 2e on both sides bend toward the radial direction inner side or bend toward the radial direction outer side.

In the pneumatic tire of the present technology, the length S of the lap splice portion 4 where the two end portions in the tire circumferential direction of the film 2 mutually overlap is preferably from 3 to 30 mm, more preferably from 5 to 21 mm, and even more preferably from 7 to 12 mm. When the length S of the lap splice portion is less than 3 mm, opening readily occurs. When the length S of the lap splice portion is greater than 30 mm, there is risk that rigidity will become excessively large relative to the peripheral region thereof, and tire uniformity will decrease.

Figure 3A:
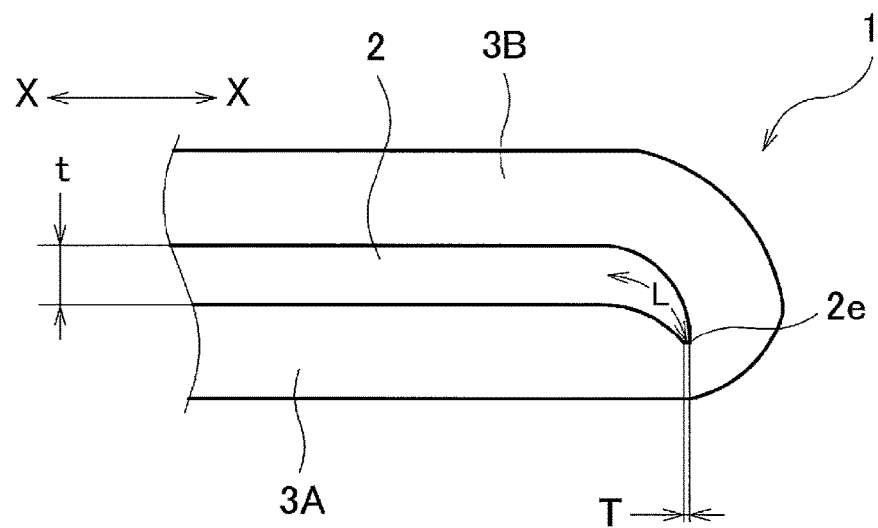
FIGS. 3A and 3B are each explanatory drawings illustrating an enlargement of a portion of a tire equator direction cross section, defining the dimensions at the end portions of the film constituting the pneumatic tire of the present technology.

As illustrated in FIG. 3A, when the thickness of the main body of the film 2 is taken as t, the thickness T of the tips 2e of the film 2 is preferably from 0.05t to 0.2t, and more preferably from 0.07t to 0.15t. When the thickness T of the tips 2e of the film 2 is less than 0.05t, there is risk that a stable lap splice will be difficult to obtain because the rigidity of the film tips decreases. When the thickness T of the tips 2e is greater than 0.2t, there is risk that it will not readily deform accordingly during the processes from green molding to vulcanization because the flexibility of the film tip portions will decrease.

Furthermore, the length L of the region in which the thickness of the film 2 decreases is preferably from 2t to 4t, and more preferably from 2.5t to 3.5t. When the length L of the portion in which the film 2 tapers is less than 2t, there is risk that a length sufficient for bending the tip portions will not be ensured. When the length L of the portion in which the film 2 tapers is greater than 4t, the distance from the film tip to the rubber sheet surface is short and there is risk that this will cause cracking to occur in the rubber sheets. In the present technology, the length L of the tapered portion is the length passing through the center in the film thickness direction, from the tip 2e of the film 2 toward the film main body up to where the thickness thereof starts to decrease.

In the present technology, the thickness t of the main body of the film 2 is not particularly limited, but is preferably from 50 μm to 200 μm, and more preferably from 70 μm to 100 μm. When the thickness t of the main body of the film 2 is less than 50 μm, there is risk that sufficient air permeation preventive properties will not be obtained when a tire is produced. When the thickness t of the film 2 is greater than 200 μm, because film rigidity is high, there is risk that the rigidity difference from the rubber sheets will be large and this will cause film delamination.

The thickness of the rubber sheets 3A, 3B is not particularly limited, but is preferably from 0.1 to 1.8 mm, and more preferably from 0.2 to 1.0 mm. When the thickness of the rubber sheets 3A, 3B is less than 0.1 mm, there is risk that the lamination operation to the film 2 will be adversely affected. When the thickness of the rubber sheets 3A, 3B is greater than 1.8 mm, it causes tire weight to increase, which is undesirable.

Figure 3B:
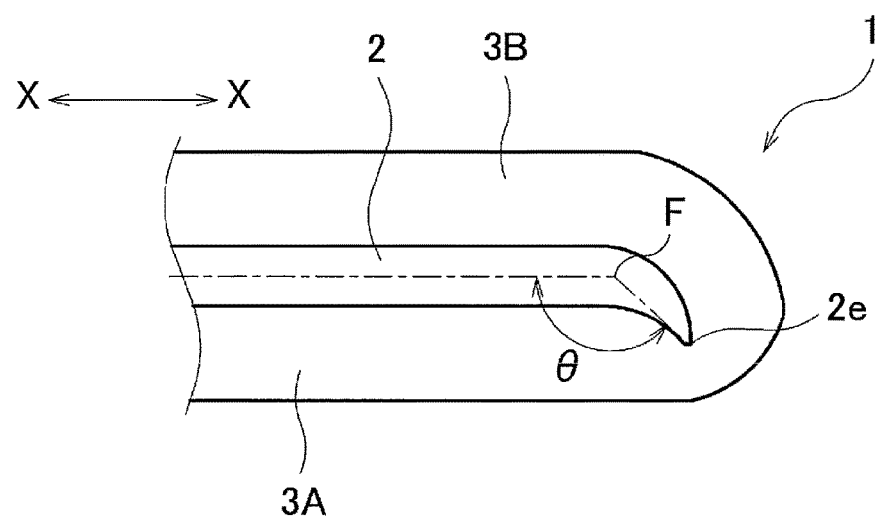
Figure 4A:
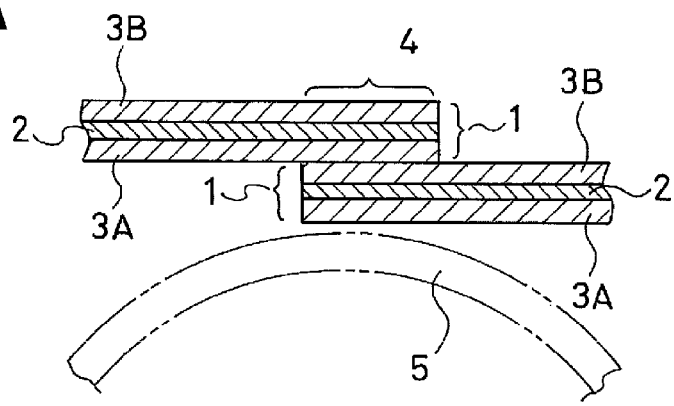
FIGS. 4A, 4B, and 4C schematically explain the tire equator direction cross section of the lap splice portion of the innerliner member in a conventional pneumatic tire.
Figure 4B:
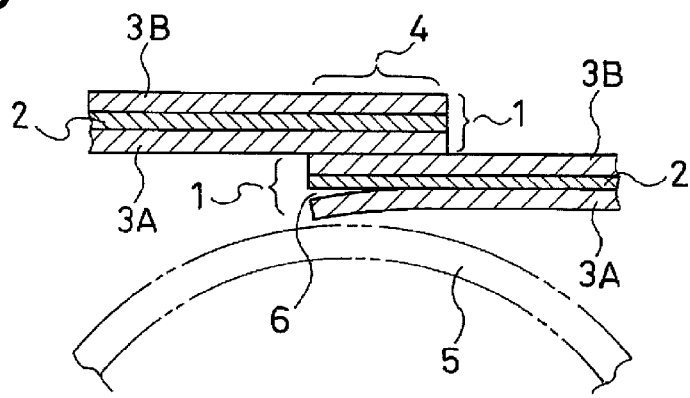
Figure 4C:
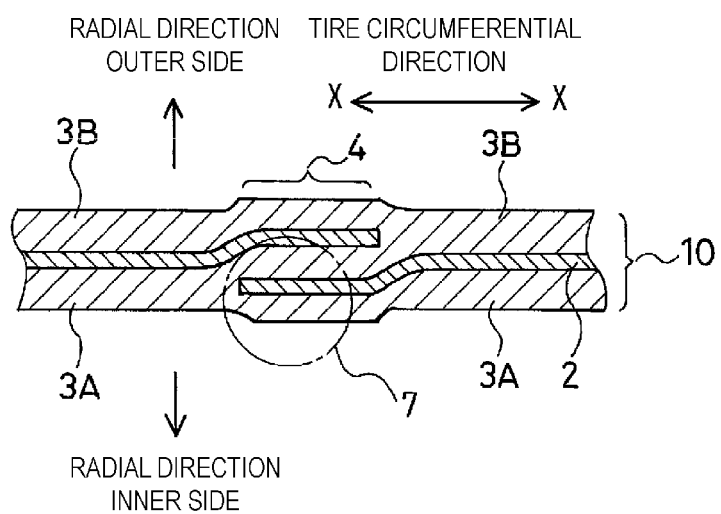

As illustrated in FIG. 3B, on the equator direction cross section of the pneumatic tire, the bend angle θ, formed by a tangent line at a point F at which the center line in the thickness direction of the film 2 starts to bend and a straight line connecting the bend starting point F and the center of thickness T of the tip 2e, is preferably from 90° to 135°, and more preferably from 100° to 130°. When the bend angle θ of the tapered bent end portions is less than 90°, the strength of the lap splice portion decreases. When the bend angle θ of the tapered bent end portions is greater than 135°, there is risk that separation of the interface between the film and rubber sheets will occur due to the peel strength of the splice portion, arising when the green tire is removed from the molding drum. As described above, the cross sections of the main bodies of the film 2 and rubber sheets 3A, 3B illustrated in FIGS. 2 to 3B extend with an adequate curvature, and the point F is on that curved line. Thus, the tangent line of that curved line at the point F is a tangent line that determines the bend angle θ.

The method for producing the pneumatic tire of the present technology uses, as the innerliner member 1, a composite sheet constituted by an at least three-layer structure including a film 2 and rubber sheets 3A, 3B layered on the two sides thereof. This composite sheet is a tapered bending structure in which at least one end portion of the film 2 decreases in thickness toward the tip 2e of the end portion, and the tip 2e bends in an out-of-plane direction of the film 2, and the tip 2e is covered by the rubber sheets 3A, 3B. The innerliner member 1 that includes the film 2 having a tapered bent end portion may be formed by pressing and cutting with a cutting tool having a rounded blade edge, at the position that is to become the end portion of the composite sheet having an at least three-layer structure including the film 2 and rubber sheets 3A, 3B on the two sides thereof. Furthermore, the film 2 is formed with a main component of a thermoplastic resin or a thermoplastic elastomer composition containing a blend of a thermoplastic resin and an elastomer.

The production method of the present technology includes a step in which an end portion of the innerliner member 1, in which the film 2 is a tapered bending structure, is mounted on a tire molding drum and started to be wound, and the other end (winding finishing end) is overlapped on the winding starting end on the tire molding drum. As a result, the tire circumferential direction end portions of the film 2 are lap spliced such that they mutually overlap via rubber sheets 3A, 3B, and at the same time, the tapered bent end portions of the film 2 are disposed on the tire radial direction inner side of the lap splice portion. On the outer circumferential side of the innerliner member wound on the tire molding drum, predetermined tire components such as a carcass layer and belt layer are layered. After that, the tire molding drum is removed from the inner circumferential surface of the innerliner member 1.

In the present technology, as described above, separation of the end portions of the rubber sheet 3A from the film 2 when the tire molding drum is removed from the inner circumferential surface of the innerliner member 1 can be suppressed.

In the production method of the present technology, the thickness T of the tips 2e relative to the thickness t of the main body of the film 2 is preferably set to from 0.05t to 0.2t, and more preferably from 0.07t to 0.15t. The length L of the region in which the thickness of the film 2 decreases at the end portions of the film 2 is preferably set to from 2t to 4t, and more preferably from 2.5t to 3.5t. The thickness t of the main body of the film 2 is preferably set to from 50 µm to 200 µm, and more preferably from 70 µm to 100 µm.

On the equator direction cross section of the pneumatic tire, the bend angle θ, formed by a tangent line at a point F at which the center line in the thickness direction of the film 2 starts to bend and a straight line connecting the bend starting point F and the center of thickness T of the tip 2e, is preferably set to from 90° to 135°, and more preferably from 100° to 130°. The length S of the lap splice portion 4 where the end portions of the two sides of the film 2 mutually overlap is preferably set to from 3 to 30 mm, more preferably from 5 to 21 mm, and even more preferably from 7 to 12 mm.

In the present technology, the film 2 is a film having a main component of a thermoplastic resin, or a film having a main component of a thermoplastic elastomer composition containing a blend of a thermoplastic resin and an elastomer.

As the resin that can be employed in the film 2, thermoplastic resin or thermosetting resin may be used, but film having thermoplastic resin as the main component is preferred due to its good ease of handling. The thermoplastic resin will be described in detail later. As the thermosetting resin, an epoxy resin, a phenolic resin, a urea resin, a melamine resin, an unsaturated polyester, a silicone resin, a polyurethane resin, and the like are preferred.

Examples of thermoplastic resin that can be used in the film 2 include a polyamide resin (e.g., nylon 6 (N6), nylon 66 (N66), nylon 46 (N46), nylon 11 (N11), nylon 12 (N12), nylon 610 (N610), nylon 612 (N612), a nylon 6/66 copolymer (N6/66), a nylon 6/66/610 copolymer (N6/66/610), nylon MXD6 (MXD6), nylon 6T, nylon 9T, a nylon 6/6T copolymer, a nylon 66/PP copolymer, a nylon 66/PPS copolymer) and an N-alkoxyalkyl compound thereof (e.g., a methoxymethyl compound of nylon 6, a methoxymethyl compound of a nylon 6/610 copolymer, or a methoxymethyl compound of nylon 612); a polyester resin (e.g., an aromatic polyester such as polybutylene terephthalate (PBT), polyethylene terephthalate (PET), polyethylene isophthalate (PEI), a PET/PEI copolymer, polyarylate (PAR), polybutylene naphthalate (PBN), a liquid crystal polyester, a polyoxyalkylene diimide acid/polybutylene terephthalate copolymer); a polynitrile resin (e.g., polyacrylonitrile (PAN), polymethacrylonitrile, an acrylonitrile/styrene copolymer (AS), a (meta)acrylonitrile/styrene copolymer, a (meta)acrylonitrile/styrene/butadiene copolymer), a polymethacrylate resin (e.g., polymethyl-methacrylate (PMMA), polyethylmethacrylic acid), a polyvinyl resin (e.g., polyvinyl acetate, a polyvinyl alcohol (PVA), a vinyl alcohol/ethylene copolymer (EVOH), polyvinylidene chloride (PVDC), polyvinylchloride (PVC), a vinyl chloride/vinylidene chloride copolymer, a vinylidene chloride/methylacrylate copolymer, a vinylidene chloride/acrylonitrile copolymer (ETFE)), a cellulose resin (e.g., cellulose acetate, cellulose acetate butyrate), a fluoride resin (e.g., polyvinylidene difluoride (PVDF), polyvinyl fluoride (PVF), polychlorofluoroethylene (PCTFE), a tetrafluoroethylene/ethylene copolymer), and an imide resin (e.g., an aromatic polyimide (PI)).

Among these, polyester resin and polyamide resin are preferred due to their physical properties, processability, and ease of handling.

Furthermore, the blend of a thermoplastic resin and an elastomer (thermoplastic elastomer composition) that can constitute the film 2 has a structure in which the elastomer is distributed as a discontinuous phase in a matrix of the thermoplastic resin. This structure provides molding workability equivalent to that of the thermoplastic resin. In the thermoplastic resin and the elastomer that constitute the thermoplastic elastomer composition, those described above may be used as the thermoplastic resin. Preferable examples of the elastomer constituting the thermoplastic elastomer composition include a diene-based rubber or a hydrogenate thereof (e.g., a natural rubber (NR), an isoprene rubber (IR), an epoxidized natural rubber, a styrene butadiene rubber (SBR), a butadiene rubber (BR, high cis-BR, and low cis-BR), a nitrile rubber (NBR), hydrogenated NBR, hydrogenated SBR), an olefin rubber (e.g., an ethylene propylene rubber (EPDM, EPM), a maleic acid modified ethylene propylene rubber (M-EPM), a butyl rubber (IIR), an isobutylene and aromatic vinyl or diene-based monomer copolymer, an acrylic rubber (ACM), an ionomer), a halogen-containing rubber (e.g., Br-IIR, CI-IIR, a brominated isobutylene-p-methylstyrene copolymer (BIMS), a chloroprene rubber (CR), a hydrin rubber (CHR), a chlorosulfonated polyethylene rubber (CSM), a chlorinated polyethylene rubber (CM), a chlorinated polyethylene rubber modified with maleic acid (M-CM)), a silicone rubber (e.g., a methyl vinyl silicone rubber, a dimethyl silicone rubber, a methylphenyl vinyl silicone rubber), a sulfur-containing rubber (e.g., a polysulfide rubber), a fluororubber (e.g., a vinylidene fluoride rubber, a vinyl ether rubber containing fluoride, a tetrafluoroethylene-propylene rubber, a silicon-based rubber containing fluoride, a phosphazene rubber containing fluoride), and a thermoplastic elastomer (e.g., a styrene elastomer, an olefin elastomer, an ester elastomer, a urethane elastomer, a polyamide elastomer).

In particular, when a plurality of elastomers are blended, it is preferable for at least 50 wt. % thereof to be a halogenated butyl rubber, a brominated isobutylene-paramethyl-styrene copolymer rubber, or a maleic anhydride-modified ethylene α-olefin copolymer rubber from the perspective of being able to increase the rubber volume ratio so as to soften and enhance the durability of the elastomer at both low and high temperatures.

In addition, it is preferable for at least 50 wt. % of the thermoplastic resin in the thermoplastic elastomer composition to be any one of nylon 11, nylon 12, nylon 6, nylon 66, a nylon 6/66 copolymer, a nylon 6/12 copolymer, a nylon 6/10 copolymer, a nylon 4/6 copolymer, a nylon 6/66/12 copolymer, aromatic nylon, or an ethylene/vinyl alcohol copolymer from the perspective of being able to obtain excellent durability.

When a thermoplastic elastomer composition is prepared by combining the above specific thermoplastic resin and elastomer, when miscibility of the two is insufficient, they may be compatibilized using an appropriate compatibility agent. By mixing the compatibility agent in the blend of thermoplastic resin and elastomer, interfacial tension between the thermoplastic resin and the elastomer is reduced, and as a result, the particle size of the elastomer that forms the dispersion phase becomes very small and thus, the characteristics of both components may be realized more effectively. In general, such a compatibility agent has a copolymer structure of both or either one of the thermoplastic resin and the elastomer, or a copolymer structure having an epoxy group, a carbonyl group, a halogen group, an amino group, an oxazoline group, or a hydroxyl group, which is capable of reacting with the thermoplastic resin or the elastomer. While the type of compatibility agent may be selected according to the type of thermoplastic resin and elastomer to be blended, such a compatibility agent generally includes: a styrene/ethylene butylene block copolymer (SEBS) or a maleic acid modified compound thereof; an EPDM, EPM, EPDM/styrene or EPDM/acrylonitrile graft copolymer or a maleic acid modified compound thereof; a styrene/maleic acid copolymer, or a reactive phenoxy, and the like. The blending proportion of such a compatibility agent is not particularly limited, but may preferably be from 0.5 to 10 parts by weight relative to 100 parts by weight of the polymer components (the total amount of the thermoplastic resin and the elastomer).

In the thermoplastic elastomer composition, the composition ratio of the thermoplastic resin and the elastomer is not particularly limited. For example, the composition ratio may be determined as necessary such that the elastomer is distributed uniformly as a discontinuous phase in the matrix of the thermoplastic resin. As a weight ratio of thermoplastic resin/elastomer, the composition ratio of the thermoplastic resin and the elastomer is preferably from 90/10 to 20/80, and more preferably from 80/20 to 30/70.

In the present technology, in addition to the above compatibility agent, other polymers may also be blended with the thermoplastic resin or the thermoplastic elastomer composition in which a thermoplastic resin and an elastomer are blended, within a range that does not harm the characteristics required for constituting the film 2, for example. The purposes of mixing such other polymers are to improve the molding workability of the material, to improve the heat resistance, to reduce cost, and the like. Examples of the material used for the polymer include polyethylene (PE), polypropylene (PP), polystyrene (PS), acrylonitrile butadiene styrene (ABS), polystyrene-butadiene-styrene (SBS), and polycarbonate (PC).

Furthermore, a reinforcing agent such as a filler (calcium carbonate, titanium oxide, alumina, and the like), carbon black, or white carbon, a softening agent, a plasticizer, a processing aid, a pigment, a dye, or an anti-aging agent that are generally compounded with polymer compounds may be optionally compounded so long as the required characteristics as the film 2 are not hindered.

Furthermore, the elastomer to be blended with the thermoplastic resin can be dynamically vulcanized when being mixed with the thermoplastic resin. A vulcanizer, a vulcanization aid, vulcanization conditions (temperature, time), and the like, during the dynamic vulcanization can be determined as appropriate in accordance with the composition of the elastomer to be added, and are not particularly limited.

When the elastomer in the thermoplastic resin composition is dynamically vulcanized in this manner, the obtained thermoplastic elastomer composition becomes a composition that contains a vulcanized elastomer. Therefore, the sheet has resistance (elasticity) against deformation from the outside, which is preferable in that the effect of the present technology can be enhanced.

Generally available rubber vulcanizers (crosslinking agents) can be used as the vulcanizer. Specifically, as a sulfur-based vulcanizer, powdered sulfur, precipitated sulfur, highly dispersible sulfur, surface treated sulfur, insoluble sulfur, dimorpholine disulfide, alkylphenol disulfide, and the like can be exemplified, and, for example, approximately from 0.5 to 4 phr (in the present specification, "phr" refers to parts by weight per 100 parts per weight of an elastomer component; similarly hereinafter) can be used.

Moreover, examples of an organic peroxide-based vulcanizing agent include benzoyl peroxide, t-butyl hydroperoxide, 2,4-dichlorobenzoyl peroxide, 2,5-dimethyl-2,5-di(t-butyl peroxy)hexane, 2,5-dimethylhexane-2,5-di(peroxyl benzoate), and the like. Such an organic peroxide-based vulcanizing agent can be used in an amount of, for example, approximately from 1 to 20 phr.

Furthermore, examples of a phenol resin-based vulcanizing agent include brominated alkylphenol resins and mixed crosslinking systems containing an alkyl phenol resin with a halogen donor such as tin chloride and chloroprene. Such a phenol resin-based vulcanizing agent can be used in an amount of, for example, approximately from 1 to 20 phr.

Examples of other vulcanizing agents include zinc oxide (approximately 5 phr), magnesium oxide (approximately 4 phr), litharge (from approximately 10 to 20 phr), p-quinone dioxime, p-dibenzoylquinone dioxime, tetrachloro-p-benzoquinone, poly-p-dinitrosobenzene (from approximately 2 to 10 phr), and methylenedianiline (from approximately 0.2 to 10 phr).

As necessary, a vulcanization accelerator may be added. As the vulcanization accelerator, from approximately 0.5 to 2 phr, for example, of a generally available vulcanization accelerator of an aldehyde-ammonia base, a guanidine base, a thiazole base, a sulfenamide base, a thiuram base, a dithio acid salt base, a thiourea base, or the like can be used.

Furthermore, as the rubber material that constitutes the rubber sheets 3A, 3B, diene-based rubbers such as natural rubber, isoprene rubber, epoxidized natural rubber, styrene-butadiene rubber, and hydrogenated styrene-butadiene rubber, or olefin-based rubbers such as ethylene-propylene rubber and maleic acid modified ethylene-propylene rubber may be advantageously used.

Furthermore, to increase adhesion between the film 2 and the adjacent rubber sheets 3A, 3B, they may be layered with an adhesive layer interposed therebetween. As the polymer that constitutes the adhesive layer, an ultra high molecular weight polyethylene having a molecular weight of not less than 1000000 and preferably not less than 3000000; acrylate copolymers such as ethylene-ethylacrylate copolymers, ethylene-methylacrylate resins, and ethylene-acrylic acid copolymers, and maleic anhydrate adducts thereof; polypropylene and maleic acid-modified products thereof; ethylene-propylene copolymers and maleic acid-modified products thereof; polybutadiene resins and maleic anhydrate-modified products thereof, styrene-butadiene-styrene copolymers; styrene-ethylene-butadiene-styrene copolymers; thermoplastic fluororesins; thermoplastic polyester resins; and the like are used.

The present technology is further described below using examples. However, the scope of the present technology is not limited to these examples.

Examples

One hundred tires of each of seven types of green tire (tire size 195/65R91H) were molded. The seven types had inner-liner layers having different configurations of the film 2 constituting the innerliner member 1 and different lengths S of the lap splice portion 4, as shown in Table 1. All tires shared a common film 2 having a main component of a thermoplastic elastomer composition containing Nylon 6/66 copolymer (N6/66) and brominated isobutylene-p-methyl-styrene copolymer (BIMS) in a weight ratio of 50/50, of which the thickness was set to 100 µm (0.1 mm). The thickness of the rubber sheets 3A, 3B was set to 0.5 mm in all tires. In the innerliner member 1 used in the pneumatic tires of Examples 1 to 4, the end portions of the film 2 on both the radial direction inner side and outer side of the splice portion were tapered bending structures, and both end portions were bent toward the radial direction inner side. Delamination resistance (separation resistance) on the inner circumferential surface of the green tire was evaluated as described below.

(a) Delamination Resistance (Separation Resistance) in Green Tire:

The inner circumferential surface of the finished green tire was visually observed, and the presence/absence of delamination at the splice portion of the innerliner was ascertained. The obtained results are listed in the "Separation resistance of green tire" column of Table 1, expressed as an index, taking the number of separations of a conventional example as 100. Smaller values of this index mean that there is less delamination of the innerliner and that moldability is better.

The obtained green tires were vulcanized, and 100 of each type of pneumatic tire were produced. Delamination resistance (separation resistance) after durability testing of the pneumatic tires was evaluated as described below.

(b) Delamination Resistance (Separation Resistance) in Pneumatic Tire (Product Tire):

The product pneumatic tire was mounted on a JATMA standard rim 15×6J and filled with air to an internal tire pressure of 120 kPa. The tire was mounted on an indoor drum testing machine (drum diameter 1707 mm) in accordance with JIS (Japanese Industrial Standard) D4230, and made to travel for 80 hours with a load of 7.24 kN and at a speed of 81 km/h. After that, the tire inner surface of the splice portion of the innerliner was visually observed, and the presence/absence of delamination and cracking were ascertained. The obtained results are listed in the "Separation resistance of product tire" column of Table 1, expressed as an index, taking the number of separations and number of cracks of a conventional example as 100. Smaller values of this index mean that there is less delamination of the innerliner and that tire durability is better.

As shown in Table 1, in the pneumatic tire according to the present technology, delamination and cracking in the vicinity of the lap splice portion are suppressed and there is no occurrence of failures, either during green tire molding or after durability testing of the produced pneumatic tire.

TABLE 1

|  |  | Conventional Example | Example 1 | Example 2 | Example 3 |
|---|---|---|---|---|---|
| Presence/absence of tapering of film 2 |  | Absent | Present | Present | Present |
| Length L of tapered portion |  | — | 3 t | 3 t | 4 t |
| Thickness (T) of tip 2e |  | — | 0.1 t | 0.1 t | 0.2 t |
| Presence/absence of bending of end portion of film 2 |  | Absent | Present | Present | Present |
| Bend angle θ | ° | (180) | 90 | 135 | 90 |
| Length S of lap splice portion 4 | mm | 10 | 10 | 10 | 10 |
| Separation resistance of green tire | Index value | 100 | 108 | 106 | 105 |
| Separation resistance of product tire | Index value | 100 | 106 | 106 | 105 |

|  |  | Example 4 | Comparative Example 1 | Comparative Example 2 |
|---|---|---|---|---|
| Presence/absence of tapering of film 2 |  | Present | Absent | Present |
| Length L of tapered portion |  | 3 t | — | 3 t |
| Thickness (T) of tip 2e |  | 0.1 t | — | 0.1 t |
| Presence/absence of bending of end portion of film 2 |  | Present | Present | Absent |
| Bend angle θ | ° | 90 | 90 | (180) |
| Length S of lap splice portion 4 | mm | 3 | 10 | 10 |
| Separation resistance of green tire | Index value | 103 | 101 | 100 |
| Separation resistance of product tire | Index value | 103 | 100 | 101 |

In the table, t is the thickness of the film main body (t = 0.1 mm).

The invention claimed is:

1. A pneumatic tire having an innerliner member pasted on a tire inner circumferential surface, the innerliner member being constituted from an at least three-layer structure including a film having a main component of a thermoplastic resin or a thermoplastic elastomer composition containing a blend of a thermoplastic resin and an elastomer, and rubber sheets layered on both sides of the film, the tire comprising a lap splice portion in which tire circumferential direction end portions of the film are overlapped via the rubber sheets; wherein, in the lap splice portion, a thickness of the film positioned on a tire radial direction inner side and outer side decreases toward tips of end portions thereof, and the tips bend toward a same direction of an outside or an inside in the tire radial direction, and the tips are covered by the rubber sheets.

2. The pneumatic tire according to claim 1, wherein, when a thickness of a main body of the film is taken as t, a thickness T of the tip is from 0.05t to 0.2t.

3. The pneumatic tire according to claim 1, wherein, when a thickness of a main body of the film is taken as t, a length L of a region in which a thickness of the film decreases is from 2t to 4t.

4. The pneumatic tire according to claim 1, wherein, on an equator direction cross section of the pneumatic tire, a bend angle θ, formed by a tangent line at a point at which a center line in a thickness direction of the film starts to bend and a straight line connecting the bend starting point and a center of thickness of the tip, is from 90° to 135°.

5. The pneumatic tire according to claim 1, wherein a length of the lap splice portion is in a range of 3 to 30 mm.

6. The pneumatic tire according to claim 1, wherein a thickness of a main body of the film is from 50 µm to 200 µm.

7. A method for producing a pneumatic tire, the method including a step of splicing an innerliner member by mutually overlapping two end portions thereof in a tire circumferential direction on an outer circumference of a tire molding drum; wherein a composite sheet is used as the innerliner member, the composite sheet being constituted from an at least three-layer structure including a film having a main component of a thermoplastic resin or a thermoplastic elastomer composition containing a blend of a thermoplastic resin and an elastomer, and rubber sheets layered on both sides of the film, an end portion of the film formed by pressing and cutting with a cutting tool having a rounded blade edge being a tapered bending structure decreasing in thickness toward a tip of the end portion, the tip bending in an out-of-plane direction of the film, and the tip being covered by the rubber sheets; and the film is lap spliced such that an end portion of the innerliner member, which is a tapered bending structure, is mounted on a tire molding drum and started to be wound, and tire circumferential direction end portions of the film mutually overlap via the rubber sheets.

8. A method for producing a pneumatic tire according to claim 7, wherein, when a thickness of a main body of the film is taken as t, a thickness T of the tip is from 0.05t to 0.2t.

9. The method for producing a pneumatic tire according to claim 7, wherein, when a thickness of a main body of the film is taken as t, a length L of a region in which a thickness of the film decreases is from 2t to 4t.

10. The method for producing a pneumatic tire according to claim 7, wherein, on an equator direction cross section of the pneumatic tire, a bend angle θ, formed by a tangent line at a point at which a center line in a thickness direction of the film starts to bend and a straight line connecting the bend starting point and a center of thickness of the tip, is from 90° to 135°.

11. A method for producing the pneumatic tire described in claim 7, wherein a lap splice length is in a range of 3 to 30 mm.

12. The method for producing a pneumatic tire according to claim 7, wherein the thickness of the main body of the film is from 50 μm to 200 μm.

* * * * *